United States Patent
Lu et al.

(10) Patent No.: US 9,282,585 B2
(45) Date of Patent: Mar. 8, 2016

(54) METHOD AND APPARATUS FOR DEVICE TO DEVICE COMMUNICATION

(75) Inventors: Qianxi Lu, Beijing (CN); Tao Chen, Espoo (FI)

(73) Assignee: Nokia Technologies Oy, Espoo (FI)

(*) Notice: Subject to any disclaimer, the term of this patent is extended or adjusted under 35 U.S.C. 154(b) by 364 days.

(21) Appl. No.: 13/883,975

(22) PCT Filed: Nov. 12, 2010

(86) PCT No.: PCT/CN2010/078667
§ 371 (c)(1),
(2), (4) Date: May 7, 2013

(87) PCT Pub. No.: WO2012/061993
PCT Pub. Date: May 18, 2012

(65) Prior Publication Data
US 2013/0223399 A1     Aug. 29, 2013

(51) Int. Cl.
*H04W 76/02* (2009.01)
*H04W 28/24* (2009.01)

(52) U.S. Cl.
CPC ........... *H04W 76/023* (2013.01); *H04W 28/24* (2013.01)

(58) Field of Classification Search
CPC ... H04W 76/00; H04W 76/02; H04W 76/021; H04W 76/022; H04W 76/023; H04W 76/04; H04W 76/043; H04W 76/045
See application file for complete search history.

(56) References Cited

U.S. PATENT DOCUMENTS

| | | | | |
|---|---|---|---|---|
| 2006/0160544 A1* | 7/2006 | Sun | .......... | H04W 8/18 455/456.1 |
| 2008/0261533 A1* | 10/2008 | Bengtsson | .......... | H04W 76/023 455/66.1 |
| 2008/0270619 A1* | 10/2008 | Davies | .......... | H04L 63/08 709/229 |
| 2011/0051683 A1* | 3/2011 | Ramankutty | ..... | H04W 36/0033 370/331 |

FOREIGN PATENT DOCUMENTS

| | | |
|---|---|---|
| CN | 101370301 A | 2/2009 |
| CN | 101657995 A | 2/2010 |
| EP | 1331786 A1 | 7/2003 |
| WO | WO-2005101873 A1 | 10/2005 |
| WO | WO-2008000303 A1 | 1/2008 |

OTHER PUBLICATIONS

PCT International Search Report dated Aug. 18, 2011 for PCT/CN2010/078667.

* cited by examiner

*Primary Examiner* — Chi H Pham
*Assistant Examiner* — Weibin Huang
(74) *Attorney, Agent, or Firm* — Mintz Levin Cohn Ferris Glovsky and Popeo, P.C.

(57) ABSTRACT

In accordance with an example embodiment of the present invention, an apparatus is configured to receive a first signaling message comprising a first identifier of a first node and a second identifier of a second node, and responsive to the receiving initiate at least one policy action relating to at least one of the first node and the second node; and transmit a second signaling message to the first node, the second signaling message being configured to cause bearer establishment between the first node and the second node.

20 Claims, 8 Drawing Sheets

| QCI value | Bearer Type |
|---|---|
| 0 | Reserved by LTE |
| 1 | EPS bearer |
| ... | EPS bearer |
| 9 | EPS bearer |
| 10 | D2D radio bearer |
| ... | D2D radio bearer |
| 18 | D2D radio bearer |
| 19 | Unused |
| ... | Unused |

METHOD AND APPARATUS FOR DEVICE TO DEVICE COMMUNICATION

RELATED APPLICATION

This application is a national stage application, filed under 35 U.S.C. §371, of PCT Application No. PCT/CN2010/078667, filed on Nov. 12, 2010, the contents of which are incorporated herein by reference in their entirety for all purposes.

TECHNICAL FIELD

The present application relates generally to device-to-device, D2D, such as for example direct device-to-device, communications, in the context of cellular networks.

BACKGROUND

There exist two kinds of wireless network architectures, centralized and distributed. A conventional infrastructure-based cellular network can be considered a centralized network whereas ad hoc or mesh networks exemplify distributed networks. In a cellular network, a terminal such as, for example, a user equipment, UE, may communicate via a base station, BS, to obtain communication with another terminal. In an ad-hoc network, a terminal may communicate with another terminal bypassing base stations using direct traffic, or a relay. Such connections between terminals may be called device-to-device connections or direct device-to-device connections.

In a cellular network, traffic may traverse a centralized controller such as a base station or a switch even if the source and destination terminals are close to each other, for example in the same cell. In this case a terminal may transmit information to a base station, which forwards the information to a switch, which may return the information to the same base station for downlink transmission to the target terminal located near the terminal originating the information.

In an ad hoc network, an originating terminal form a direct radio connection to a target terminal and transmit information over a direct device-to-device connection, so that the information doesn't traverse any intermediate nodes along the way from the originating terminal to the target terminal. In cases where communicating terminals are geographically close to each other, they may accomplish communicating a given amount of information using less energy than would be required to communicate it via a cellular system. This is even more so when the terminals are simultaneously close to each other but far from a base station.

Combining ad hoc and cellular communications may provide a solution where a cellular network participates in coordinating the use of radio resources by ad hoc terminals. Radio resources may comprise, for example, frequency bands, time slots, spreading codes and other similar resources or their combinations. In such cases terminals are capable of communicating both with base stations and directly with other terminals.

SUMMARY

Various aspects of examples of the invention are set out in the claims.

According to a first aspect of the present invention, there is provided an apparatus, comprising memory configured to store a first identifier relating to the apparatus, a receiver configured to receive a second identifier relating to a second apparatus, a processing core configured to compile a signaling message comprising the first identifier and the second identifier, the processing core being configured to initiate bearer establishment between the apparatus and the second apparatus by causing a transmitter comprised in the apparatus to transmit the signaling message.

According to a second aspect of the present invention, there is provided a method, comprising storing a first identifier relating to the apparatus, receiving a second identifier relating to a second apparatus, compiling a signaling message comprising the first identifier and the second identifier, and initiating bearer establishment between the apparatus and the second apparatus by transmitting the signaling message.

According to a third aspect of the present invention, there is provided an apparatus, comprising at least one processor, at least one memory including computer program code, the at least one memory and the computer program code configured to, with the at least one processor, cause the apparatus to perform at least the following: receive a first signaling message comprising a first identifier of a first node and the second identifier of a second node, responsive to the receiving, initiate at least one policy action relating to at least one of the first node and the second node; and transmit a second signaling message to the first node, the second signaling message being configured to cause bearer establishment between the first node and the second node.

According to a fourth aspect, there are provided computer programs configured to cause methods in accordance with embodiments of the present invention to be performed when run on a computer.

BRIEF DESCRIPTION OF THE DRAWINGS

For a more complete understanding of example embodiments of the present invention, reference is now made to the following descriptions taken in connection with the accompanying drawings in which.

DETAILED DESCRIPTION OF THE DRAWINGS

An example embodiment of the present invention and its potential advantages are understood by referring to FIGS. 1 through 5 of the drawings.

Figure 1:
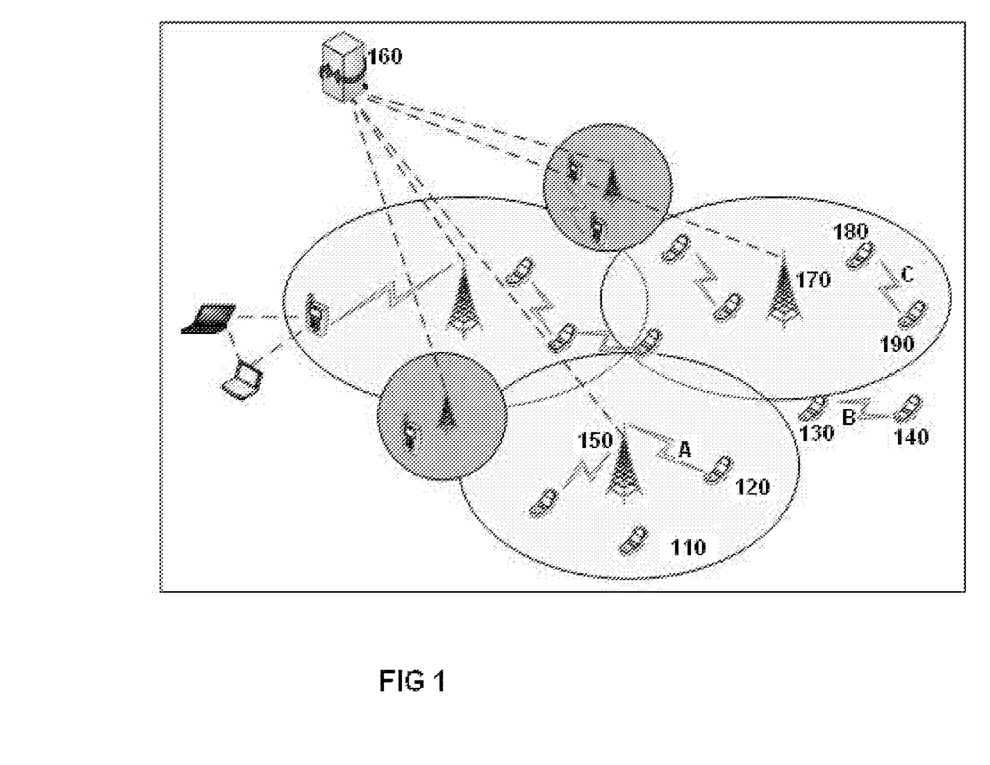
FIG. 1 illustrates a communication system compatible with some embodiments of the present invention.

FIG. 1 illustrates a communication system compatible with some embodiments of the present invention. FIG. 1 illustrates mobile terminals, such as terminals 110, 120, 130, 140, 180 and 190. Mobile terminals may be considered mobile nodes.

In FIG. 1, terminal 120 is in communication with base station 150 by means of communications link A. Link A is illustrated as a wireless radio link, but in other embodiments it may be a wire-line links as well. Link A may comprise an uplink capable of communicating information from terminal 120 to base station 150 and a downlink capable of communicating information from base station 150 to terminal 120. Link A may be in conformance with wireless standards, such as for example wideband code division multiple access, WCDMA or long term evolution, LTE.

Base station 150 may be a base station according to WCDMA, known as a node-B, or a base station according to LTE, known as an eNB, or another kind of base station such as, for example, a wireless local area network, WLAN, access point. Base station 150 may be operably connected to a core network 160, for example a core network of a cellular communications system. The functionalities of base station 150 and core network 160 depend on design solutions adopted. The connection between base station 150 and core network 160 may be a wire-line connection, for example a high-capacity ethernet connection, or a wireless connection such as, for example, a directional microwave link. In some embodiments, base station 150 may be connected to core network 160 via a further entity such as a radio network controller or a base station controller, not illustrated. The communication system illustrated in FIG. 1 comprises also other base stations than base station 150 and terminals other than terminals 110 and 120.

FIG. 1 illustrates also terminal 130 and terminal 140, which may substantially resemble terminal 120. Terminals 130 and 140 are interconnected by a direct device-to-device link B, which is illustrated in the illustrated embodiment as a wireless link. Link B may use radio resources of the cellular system, unlicensed radio resources, or a resource set that comprises both unlicensed resources and resources allocated to the cellular system. Terminals 130 and 140 are illustrated in FIG. 1 as outside a coverage area of base station 150, or other base stations of the illustrated cellular system. FIG. 1 illustrates also terminals 180 and 190, interconnected by a device-to-device link C which may be substantially similar to link B, for example. Terminals 180 and 190 are located in a geographical area corresponding to a cell controlled by base station 170, which may substantially resemble base station 150, for example. Alternatively base station 170 may conform to a different wireless standard than base station 150, in which case the illustrated communication system is a multi-standard system. Since terminals 180 and 190 are within communication range of base station 170, the possibility presents itself that base station 170 participates in coordinating the use of radio resources in link B. This kind of operation may be known as centralized or cellular-directed device-to-device communication. A benefit associated with centralized operation is resource control and interference control provided thereby.

To accomplish centralized operation, at least one of terminals 180 and 190 is configured to communicate with base station 170 to obtain information defining or advising which resources terminals 180 and 190 should use for link C. Where terminals 180 and 190 are cellular terminals, the cellular system may also perform policy actions relating to link C. Examples of policy actions include policy control and charging. Policy control may comprise, for example, controlling a maximum amount of information transmitted or restricting applications or application types comprised in a terminal from using link C, for example. Charging may comprise charging the subscriber of at least one of terminal 180 and terminal 190 for information communicated over link C. Charging may comprise pre-paid charging or post-paid charging. Transmitting information over link C may be charged at a different, for example lower or higher, rate than transmitting the same information between terminals 180 and 190 via base station 170.

Terminal 180, for example, may determine that terminal 190 is close enough for a device-to-device link C to be formed between terminals 180 and 190. Device-to-device link C may also be known as device-to-device bearer C. Terminal 180 may determine this by receiving a beacon transmission from terminal 190, or alternatively terminal 180 may determine this by receiving location information relating to terminal 190. Terminal 180 may compare the received location information to its own location information to determine that a device-to-device link C would be feasible. Terminal 190 may be furnished with self-locating capability, for example a satellite positioning receiver, and terminal 190 may be configured to transmit a message to terminal 180 comprising location information regarding itself via the cellular system, for example in a compact data message. In some embodiments, a cellular system may be furnished with capability to determine locations of terminals within cells comprised in the cellular system. This may be accomplished algorithmically by observing the timing offsets at which signals originating from terminals arrive at base stations 150, 170 comprised in the cellular system, for example. Some cellular systems may also have the capability to determine the directions from which signals originating from terminals arrive at base stations in addition to timing offsets. Where a cellular system determines that two terminals are sufficiently close to each other to make a device-to-device link possible, the system may be configured to advise the terminals of this possibility. Terminal 180 may be configured to determine that terminal 190 is close enough for a device-to-device link C to be formed between terminals 180 and 190 responsive to receiving said advice from the cellular system.

Responsive to determining that terminal 190 is within range for a device-to-device link, terminal 180 may be configured to initiate actions to establish a device-to-device link between terminals 180 and 190. In a system operating in a centralized fashion, terminal 180 may be configured to initiate signaling toward the cellular system. Terminal 180 may be configured to include in signaling messages relating to device-to-device links an indication that the signaling message related to a device-to-device link. In some embodiments, the indication comprises a quality of service class identifier, QCI, of the signaling message set to a predefined value comprised in a predefined value range. In some other embodiments, the indication comprises an allocation and retention priority, ARP, value of the signaling message set to a predefined value comprised in a predefined value range. The predefined value range may be reserved for device-to-device links and values within the predefined range may correspond to different types of device-to-device links. In some embodiments, the predefined value range comprises only one value. Different types of device-to-device links may comprise file transfer links, packet voice calls and continuously connected background links.

Responsive to receiving the signaling message, a node comprised in the cellular system may be configured to determine that the signaling message relates to a device-to-device link by determining that the signaling message comprises the indication. The signaling message may be, for example, a create bearer request message. In embodiments where the signaling message is forwarded in the cellular system through more than one node, each node may determine from the indication that the signaling message relates to a device-todevice link. Responsive to the signaling message, the cellular system and nodes therein may be configured to initiate policy actions relating to device-to-device link C.

Terminal 180 may include in the signaling message an identifier of terminal 180 and also an identifier of terminal 190. The identifiers may be, for example international mobile subscriber identity, IMSI, values or other suitable identifiers such as, for example, SIP URIs. Responsive to receiving the signaling message, the cellular system may be configured to initiate a signaling connection, for example a control signaling tunnel, with terminal 180 as one endpoint and a network node comprised in the cellular system as a second endpoint. A control signaling tunnel is sometimes known as a control-plane tunnel. By including identifiers of both terminals, terminal 180 in some embodiments obviates the need for terminal 190 to signal toward the cellular system to establish device-to-device link C. In the network, applied signaling may include identifiers of both terminal 180 and 190 in the form of tunnel endpoint identifiers, TEID, used in GPRS tunneling protocol, GTP. The control-plane tunnel may relate to device-to-device link C with respect to terminal 180 and terminal 190, obviating the need for a separate tunnel from terminal 190 to the cellular system. If the cellular system needs to signal control information to terminal 190, it may do so via the tunnel to terminal 180 and link C. The GTP protocol comprises a GTP control, or GTP-C protocol. In some embodiments, the identifiers are GTP-C TEIDs. In some embodiments, signaling messages conveyed in a signaling tunnel relating to link C with respect to terminal 180 and terminal 190 comprise TEID identifiers of both terminals.

In some embodiments, terminals 180 and 190 establish bearers toward the cellular system in connection with establishing device-to-device link C. The established bearers may be associated with device-to-device link C. In some embodiments, terminals have default bearers toward the cellular system that can be associated with device-to-device link C in connection with its establishment. Bearers established toward the cellular system associated with a device-to-device link can act as backup bearers in case the device-to-device link fails, for example due to movement of terminals 180 and 190 relative to each other. Since a device-to-device link may be a low-power link, it may be susceptible to radio path problems associated, for example, with increasing distance between the participating terminals. Responsive to determining that a device-to-device link is failing or has failed, a terminal acting as an endpoint of the device-to-device link may signal toward the cellular system to inform of the failure. Responsive to this signal, the cellular system may be configured to cause both terminals to revert to using backup bearers and re-direct information flows from the device-to-device link to traverse the cellular system. In this way, the flows can be sustained even if the terminals move out of device-to-device communication range and users of the terminals may not even notice a difference.

Figure 2:
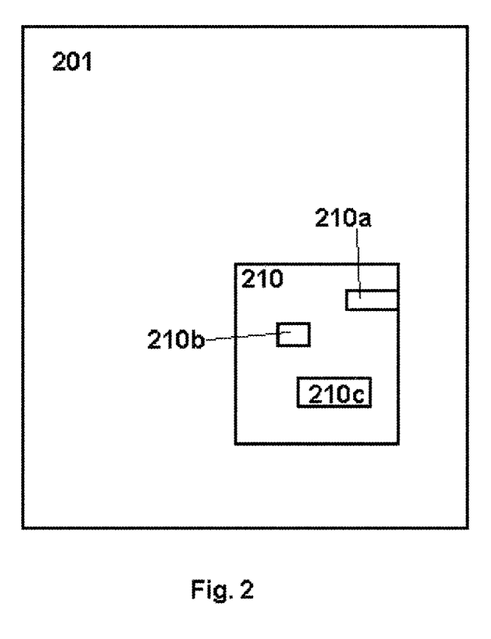
FIG. 2 illustrates an example apparatus capable of supporting embodiments of the present invention.

FIG. 2 illustrates an example apparatus 201 capable of supporting embodiments of the present invention. The apparatus may correspond to apparatus 110, base station 120 or a node in core network 130 of FIG. 1, for example. The apparatus is a physically tangible object, for example a mobile telephone, personal digital assistant, data dongle or a similar device. The apparatus may comprise a control apparatus 210, for example a digital signal processor, DSP, processor, field-programmable gate array, FPGA, application-specific integrated circuit, ASIC, chipset or controller. The apparatus may further comprise a transmitter and/or a receiver 210a configured to enable the apparatus 201 to connect to other apparatuses. A combination of transmitter and receiver may be called a transceiver. The apparatus may comprise memory 210b configured to store information, for example an identifier of the apparatus. The memory may be solid-state memory, dynamic random access memory, DRAM, magnetic, holographic or other kind of memory. The apparatus may comprise logic circuitry 210c configured to access the memory 210b and control the transmitter and/or a receiver 210a. The logic circuitry 210c may be implemented as software, hardware or a combination of software and hardware. The logic circuitry may comprise a processing core. The logic circuitry 210c may execute program code stored in memory 210b to control the functioning of the apparatus 201 and cause it to perform functions related to embodiments of the invention. The logic circuitry 210c may be configured to initiate functions in the apparatus 201, for example the sending of data units via the transmitter and/or a receiver 210a. The logic circuitry 210c may be control circuitry. The transmitter and/or a receiver 210a, memory 210b and/or logic circuitry 210c may comprise hardware and/or software elements comprised in the control apparatus 210. Memory 210b may be comprised in the control apparatus 210, be external to it or be both external and internal to the control apparatus 210 such that the memory is split to an external part and an internal part. If the apparatus 201 does not comprise a control apparatus 210 the transmitter and/or a receiver 210a, memory 210b and logic circuitry 210c may be comprised in the apparatus as hardware elements such as integrated circuits or other electronic components. The same applies if the apparatus 201 does comprise a control apparatus 210 but some, or all, of the transmitter and/or a receiver 210a, memory 210b and logic circuitry 210c are not comprised in the control apparatus 210. In embodiments where apparatus 201 is a mobile user equipment, apparatus 201 may comprise at least one antenna.

Figure 3:
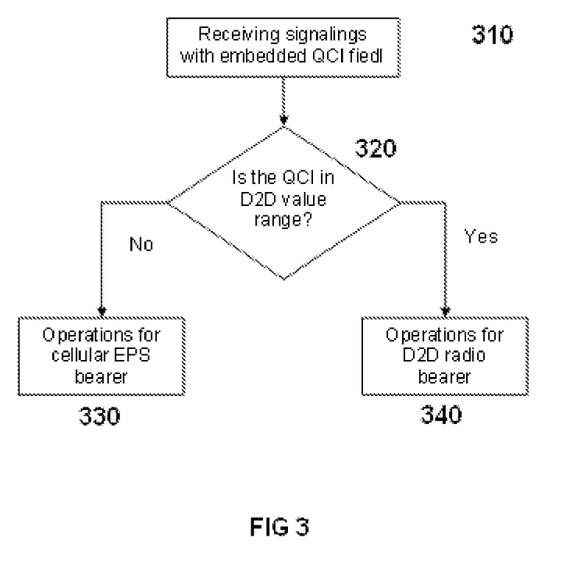
FIG. 3 is a flow diagram showing operations for handling a signaling message in a cellular network node according to some embodiments.

FIG. 3 is a flow diagram showing operations for handling a signaling message in a cellular network node according to some embodiments of the invention. In phase 310, a node comprised in this example embodiment in an LTE network receives a signaling message. In phase 320, the node is configured to determine whether an indication is comprised in the signaling message indicating that the signaling message relates to a device-to-device link. In the illustrated example, the indication takes the form of a predefined QCI value. Responsive to a positive determination, processing advances to phase 340, where the signaling message is treated as relating to a device-to-device bearer. Responsive to a negative determination, processing advances to phase 330, where the signaling message is treated as relating to a cellular bearer.

Figure 4:
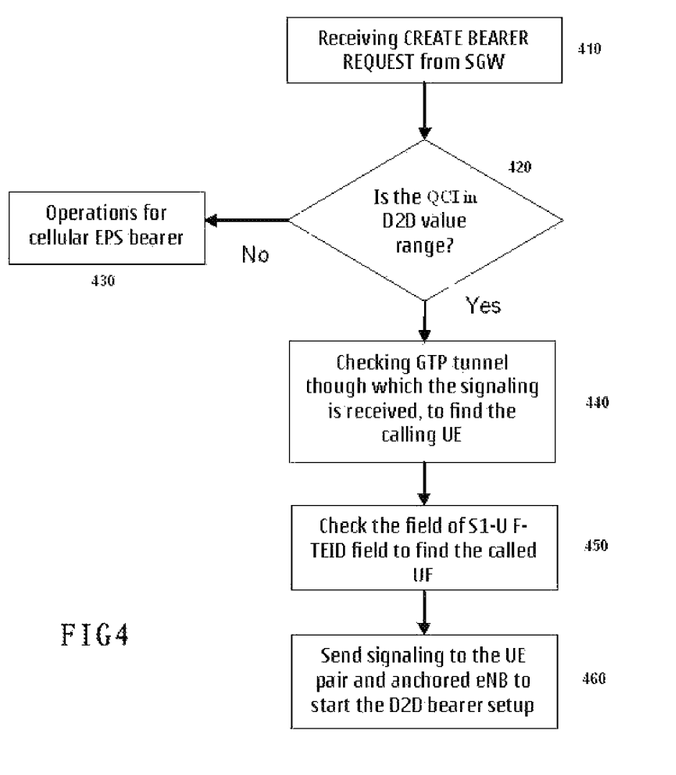
FIG. 4 is a flow diagram showing operations for handling a signaling message in a cellular network node according to some embodiments.

FIG. 4 is a flow diagram showing operations for handling a signaling message, in this example a create bearer request, in a cellular network node according to some embodiments of the invention. In the illustrated example, handling takes place in a mobility management entity, MME, of an LTE core network, but the invention is not restricted thereto. Phase 410 may substantially correspond to phase 310 in FIG. 3. In the illustrated example, a signaling message is received in an MME from a serving gateway, SGW. Phase 420 may substantially correspond to phase 320 in FIG. 3. Phase 430 may substantially correspond to phase 330 in FIG. 3. In phase 440, having determined from the indication that the signaling message relates to a device-to-device link, the MME may be configured to determine an identity of a calling terminal. The identity of the calling terminal may be determined from the tunnel from which the signaling message originates. The identity may be determined from a tunnel endpoint identifier, for example. In phase 450 the MME may be configured to determine an identity of the called terminal from an identifier relating to the called terminal comprised in the signaling message. The identifier relating to the called terminal may also be a tunnel endpoint identifier, TEID, for example. In the illustrated example, the TEID value of the called terminal is a S1 interface user plane, S1-U, TEID. Finally in phase 460, the MME may be configured to initiate signaling to the terminals to start setup of the device-to-device link.

Figure 5:
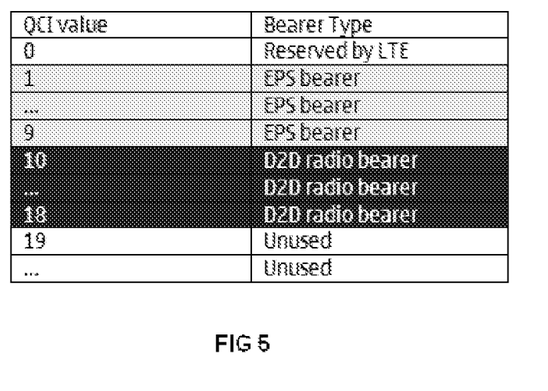
FIG. 5 illustrates an example of predefined value ranges for indicating that a signaling message relates to a device-to-device link according to an example embodiment of the invention.

FIG. 5 illustrates an example of predefined value ranges for indicating that a signaling message relates to a device-to-device link according to an example embodiment of the invention. According to this example, the system is an LTE system in which centralized device-to-device links are enabled. Also according to this example, the indication indicating that the signaling message relates to a device-to-device bearer comprises a quality of service class identifier, QCI, set to a predefined value. In the example, values 0-9 are reserved for use by the LTE system and values 10-18 form a predefined value range indicating that a signaling message in which this indication is comprised relates to a device-to-device link. In the predefined value range, individual values may correspond to device-to-device links of different types. Nodes comprised in the cellular system may be configured to respond in different ways to different values comprised in the predefined range 10-18. In the illustrated example, values 19 onward are not defined.

Figure 6:
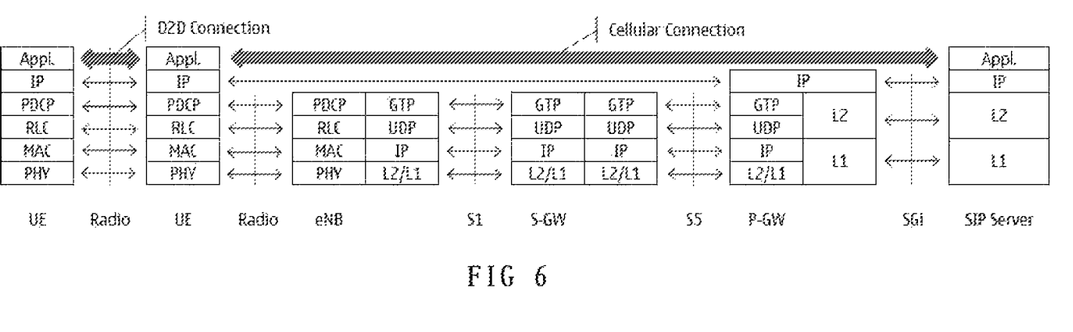
FIG. 6 illustrates an example system according to an embodiment of the invention.

FIG. 6 illustrates an example system according to an embodiment of the invention. Two terminals, labeled UE, are on the left-hand-side of the figure and arranged there inbetween is a device-to-device link, labeled D2D Connection. Only one of the terminals is illustrated as being in communication with a cellular system, having a connections terminating in a base station, labeled eNB, a PDN gateway node, labeled P-GW, and an application server, labeled SIP Server for session initiation protocol server. The connection to the application server may be an application-layer connection. The connection to P-GW may be a control signaling connection, for example to convey control signaling for both terminals engaged in device-to-device communications. Illustrated in the figure is also a serving gateway, S-GW. Interface S1 connects the base station and the serving gateway, and interface S5 connects the serving gateway S-GW to gateway P-GW. Communication layers are illustrated, wherein in this example IP is an internet protocol layer, PDCP is a packet data convergence protocol layer, RLC is a radio-link control layer, MAC is a medium-access control layer, PHY is a physical layer, and Appl is an application layer. Further in this example, GTP is a GPRS tunneling protocol layer, UDP is a user datagram protocol layer, and L2/L1 is a layer-2/layer-1 layer.

Figure 7:
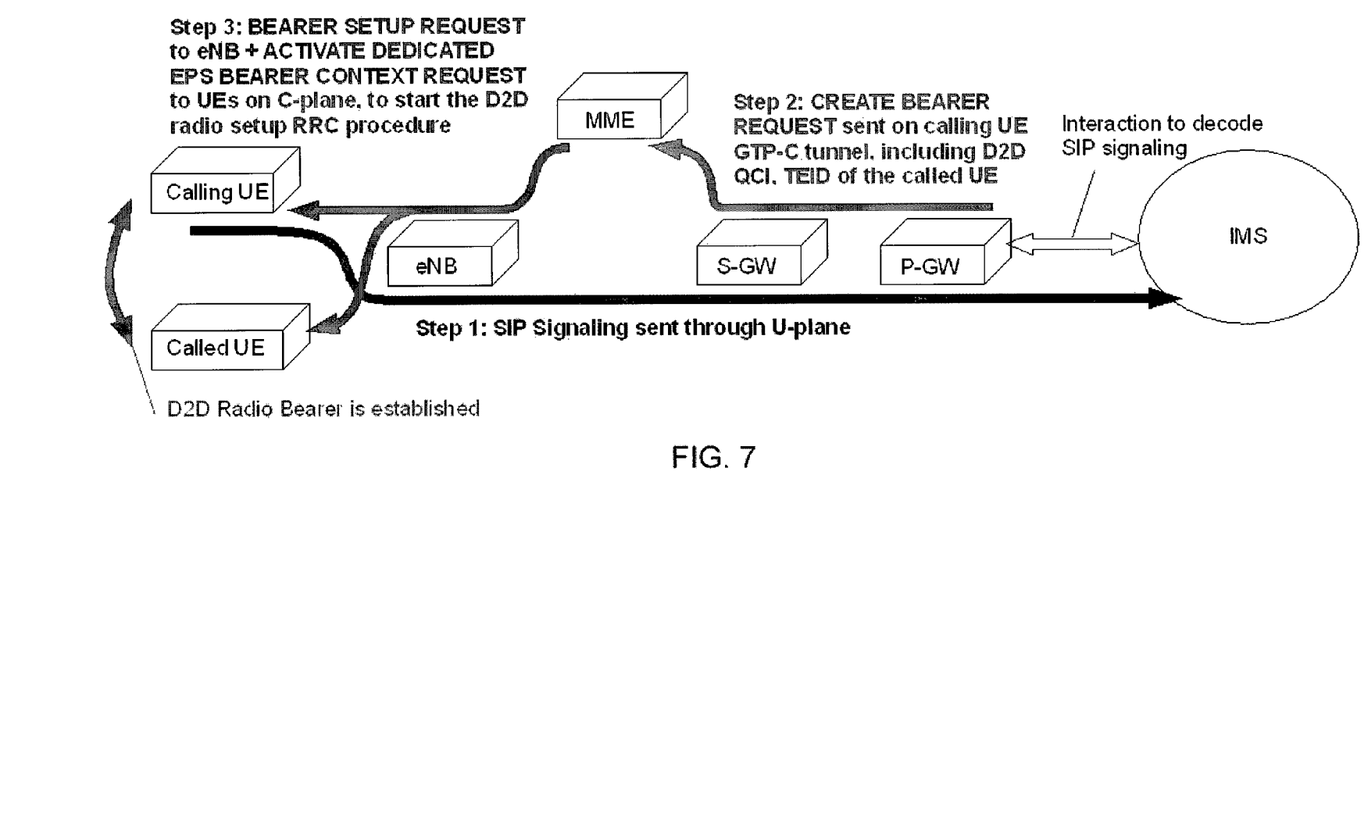
FIG. 7 illustrates an example procedure in an embodiment of the invention.

FIG. 7 illustrates an example procedure in an embodiment of the invention. In step 1, a calling terminal, in this example a user equipment, UE, transmits a signaling message to cause a cellular system to take measures to configure a device-to-device connection between the calling UE and a called UE. The signaling message may comprise identifiers relating to the calling and called UEs. At least one of the IMS, P-GW and S-GW may be configured to initiate at least one policy action responsive to the signaling message of step 1. In step 2, an internet protocol, IP, multimedia subsystem, IMS, transmits a create bearer request message to an MME via P-GW and S-GW, which were discussed in connection with FIG. 6. The create bearer request of step 2 may comprise TEID values of the calling UE and the called UE. The create bearer request of step 2 may be transmitted in a GTP-C tunnel of the calling UE. The create bearer request of step 2 may comprise an indication indicating that the request relates to a device-to-device bearer. In step 3, the MME may be configured to cause the requested device-to-device bearer to be set up by transmitting a bearer setup message to the eNB serving the calling UE. The MME may also be configured to activate a dedicated bearer, such as for example and evolved packet system, EPS, bearer, in connection with causing the requested device-to-device bearer to be set up. The messaging of step 3 may take place on a control plane.

Figure 8:
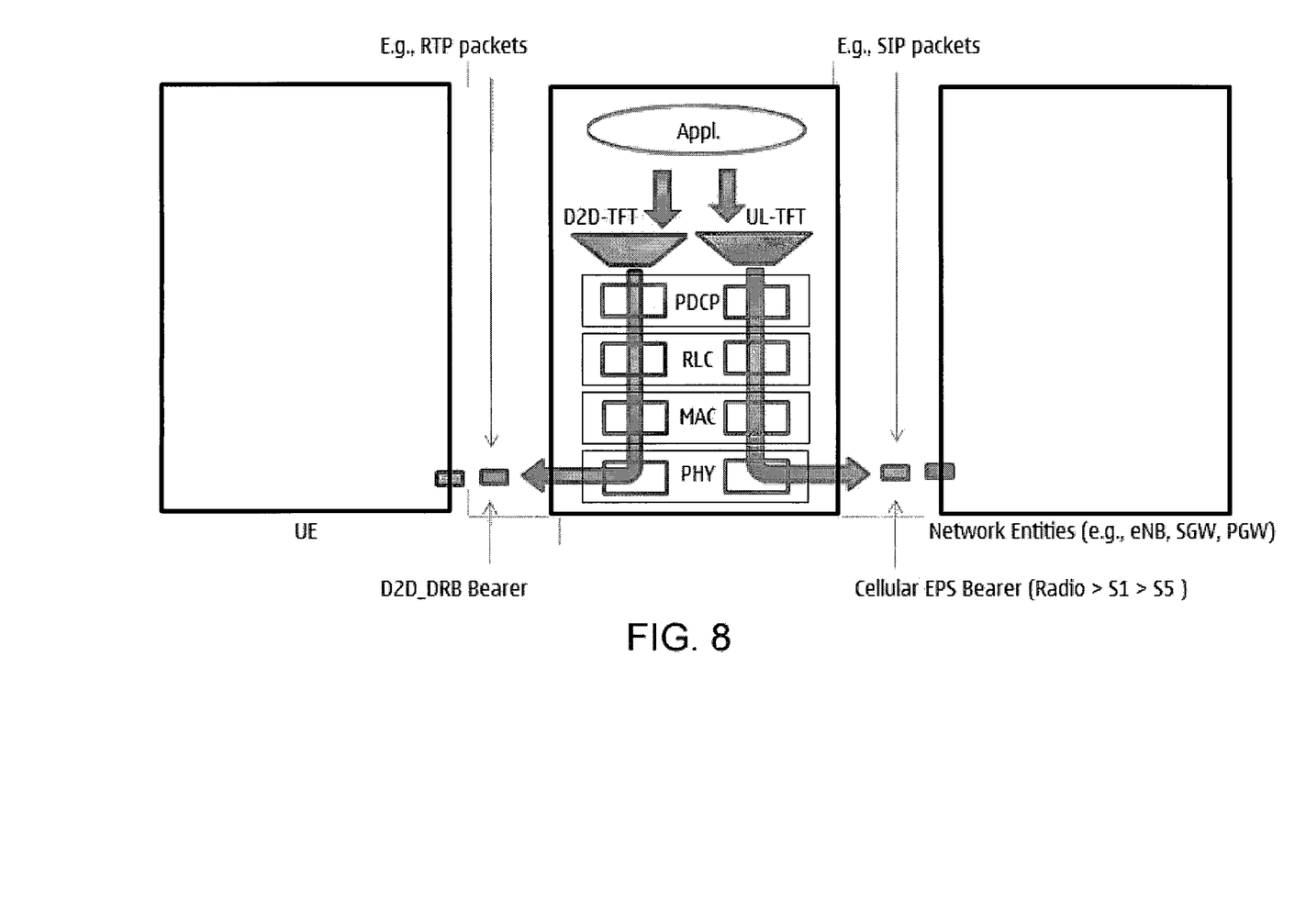
FIG. 8 illustrates an example traffic flow template according to an embodiment of the invention.

FIG. 8 illustrates an example traffic flow template, TFT, according to an embodiment of the invention. According to the illustrated example embodiment, a device-to-device bearer is accompanied by a cellular bearer, for example an EPS bearer. The illustrated TFT defines what content is routed to the device-to-device, D2D, bearer and which content is routed to the cellular bearer. For example, data packets such as real-time transport protocol, RTP, packets may be directed to the D2D bearer while signaling, for example higher-layer signaling, is directed toward the cellular bearer. Examples of higher-layer signaling include SIP, session description protocol, SDP, and RTP control protocol, RTCP packets.

A TFT pertaining to a D2D bearer may be updated or re-configured by signaling from the cellular system. For example, the cellular system may transmit a modify EPS bearer context request comprising an indication that the request relates to a device-to-device bearer. The request may comprise updated parameters for the TFT. The request may comprise a request to activate or deactivate the TFT. The request may be issued responsive to a policy action in the cellular system, for example a depletion of a prepaid account. The TFT of FIG. 8 may be used in connection with other described embodiments.

Without in any way limiting the scope, interpretation, or application of the claims appearing below, a technical effect of one or more of the example embodiments disclosed herein is that a signaling tunnel from a called terminal is not needed for device-to-device links. Another technical effect of one or more of the example embodiments disclosed herein is that signaling relating to device-to-device links can be identified as such and separated from other signaling. Another technical effect of one or more of the example embodiments disclosed herein is that a cellular system may conserve radio resources by moving traffic to device-to-device bearers.

Embodiments of the present invention may be implemented in software, hardware, application logic or a combination of software, hardware and application logic. The software, application logic and/or hardware may reside on memory 210*b*, for example. If desired, part of the software, application logic and/or hardware may reside in control apparatus 210. In an example embodiment, the application logic, software or an instruction set is maintained on any one of various conventional computer-readable media. In the context of this document, a "computer-readable medium" may be any media or means that can contain, store, communicate, propagate or transport the instructions for use by or in connection with an instruction execution system, apparatus, or device, such as a computer, with one example of a computer described and depicted in FIG. 2. A computer-readable medium may comprise a computer-readable non-transitory storage medium that may be any media or means that can contain or store the instructions for use by or in connection with an instruction execution system, apparatus, or device, such as a computer. The scope of the invention comprises computer programs configured to cause methods according to embodiments of the invention to be performed.

If desired, the different functions discussed herein may be performed in a different order and/or concurrently with each other. Furthermore, if desired, one or more of the above-described functions may be optional or may be combined.

Although various aspects of the invention are set out in the independent claims, other aspects of the invention comprise other combinations of features from the described embodiments and/or the dependent claims with the features of the independent claims, and not solely the combinations explicitly set out in the claims.

It is also noted herein that while the above describes example embodiments of the invention, these descriptions should not be viewed in a limiting sense. Rather, there are several variations and modifications which may be made without departing from the scope of the present invention as defined in the appended claims

What is claimed is:

1. An apparatus comprising:
   at least one processor; and
   at least one memory including computer program code, the at least one processor, the at least one memory, and the computer program code configured to cause the apparatus to at least:
   store a first identifier relating to the apparatus;
   receive a second identifier relating to a second apparatus;
   compile a signaling message comprising the first identifier and the second identifier, wherein the signaling message further comprises an indication indicating that the signaling message relates to a device-to-device bearer; and
   initiate bearer establishment between the apparatus and the second apparatus by transmitting the signaling message,
   wherein the initiating bearer establishment comprises establishing a direct device-to-device wireless link between the apparatus and the second apparatus.

2. The apparatus according to claim 1, wherein the first identifier and second identifier are international mobile subscriber identity identifiers.

3. The apparatus according to claim 1, wherein the indication comprises a quality of service class identifier set to a predefined value comprised in a predefined value range.

4. The apparatus according to claim 3, wherein the apparatus is configured to operate as an endpoint for a signaling tunnel, and to convey cellular network signaling relating to the established direct device-to-device bearer for the apparatus and the second apparatus via the signaling tunnel.

5. The apparatus according to claim 1, wherein the apparatus resides in a user equipment comprising an antenna operably connected to a receiver, the antenna configured to provide at least one information flow to the receiver.

6. A method comprising:
   storing a first identifier relating to the apparatus;
   receiving a second identifier relating to a second apparatus;
   compiling a signaling message comprising the first identifier and the second identifier, wherein the signaling message further comprises an indication indicating that the signaling message relates to a device-to-device bearer; and
   initiating bearer establishment between the apparatus and the second apparatus by transmitting the signaling message,
   wherein the initiating bearer establishment comprises establishing a direct device-to-device wireless link between the apparatus and the second apparatus.

7. The method according to claim 6, wherein the first identifier and second identifier are tunnel endpoint identifiers.

8. The method according to claim 6, wherein the indication comprises a quality of service class identifier set to a predefined value comprised in a predefined value range.

9. The method according to claim 8, wherein values within the predefined value range correspond to different types of device-to-device bearer.

10. An apparatus comprising:
    at least one processor; and
    at least one memory including computer program code, the at least one processor, the at least one memory, and the computer program code configured to cause the apparatus to at least:
    receive a first signaling message comprising a first identifier of a first node and a second identifier of a second node, wherein the first signaling message is configured to initiate bearer establishment comprising establishment of a direct device-to-device wireless link between the first node and the second node;
    responsive to the receiving, initiate at least one policy action relating to at least one of the first node and the second node, wherein the at least one policy action comprises at least one of a policy control procedure and a charging procedure; and
    transmit a second signaling message to the first node, the second signaling message being configured to cause the bearer establishment between the first node and the second node.

11. The apparatus according to claim 10, wherein the first identifier and second identifier are tunnel endpoint identifiers.

12. The apparatus according to claim 10, wherein the first signaling message further comprises an indication indicating that the first signaling message relates to a device-to-device bearer.

13. The apparatus according to claim 12, wherein the indication comprises a quality of service class identifier set to a predefined value comprised in a predefined value range.

14. The apparatus according to claim 10, wherein the apparatus is configured to operate as an endpoint for a signaling tunnel, and to receive cellular network signaling relating to the established direct device-to-device bearer for the first node and the second node via the signaling tunnel.

15. A computer program product comprising a non-transitory computer-readable medium encoded with instructions that, when executed by at least one processor, perform at least the following:
    storing a first identifier relating to an apparatus;
    receiving a second identifier relating to a correspondent apparatus;
    compiling a signaling message comprising the first identifier and the second identifier, wherein the signaling message further comprises an indication indicating that the signaling message relates to a device-to-device bearer; and
    initiating bearer establishment between the apparatus and the correspondent apparatus by transmitting the signaling message,
    wherein the initiating bearer establishment comprises establishing a direct device-to-device wireless link between the apparatus and the correspondent apparatus.

16. A method comprising:
    receiving a first signaling message comprising a first identifier of a first node and a second identifier of a second node, wherein the first signaling message is configured to initiate bearer establishment comprising establishment of a direct device-to-device wireless link between the first node and the second node;
    responsive to the receiving, initiating at least one policy action relating to at least one of the first node and the second node, wherein the at least one policy action comprises at least one of a policy control procedure and a charging procedure; and transmitting a second signaling message to the first node, the second signaling message being configured to cause the bearer establishment between the first node and the second node.

17. The method according to claim 16, wherein the first identifier and second identifier are tunnel endpoint identifiers.

18. The method according to claim 16, wherein the first signaling message further comprises an indication indicating that the first signaling message relates to a device-to-device bearer.

19. The method according to claim 18, wherein the indication comprises a quality of service class identifier set to a predefined value comprised in a predefined value range.

20. A computer program product comprising a non-transitory computer-readable medium encoded with instructions that, when executed by at least one processor, perform at least the following:

receiving a first signaling message comprising a first identifier of a first node and a second identifier of a second node, wherein the first signaling message is configured to initiate bearer establishment comprising establishment of a direct device-to-device wireless link between the first node and the second node;

responsive to the receiving, initiating at least one policy action relating to at least one of the first node and the second node, wherein the at least one policy action comprises at least one of a policy control procedure and a charging procedure; and transmitting a second signaling message to the first node, the second signaling message being configured to cause the bearer establishment between the first node and the second node.

\* \* \* \* \*